(12) United States Patent
Buelow et al.

(10) Patent No.: US 8,805,044 B2
(45) Date of Patent: Aug. 12, 2014

(54) SEGMENTING PULMONARY ARTERIES

(75) Inventors: Thomas Buelow, Grosshansdorf (DE); Rafael Wiemker, Kisdorf (DE)

(73) Assignee: Koninklijke Philips N.V., Eindhoven (NL)

( * ) Notice: Subject to any disclaimer, the term of this patent is extended or adjusted under 35 U.S.C. 154(b) by 379 days.

(21) Appl. No.: 12/937,289

(22) PCT Filed: Apr. 14, 2009

(86) PCT No.: PCT/IB2009/051542
§ 371 (c)(1),
(2), (4) Date: Nov. 16, 2010

(87) PCT Pub. No.: WO2009/128020
PCT Pub. Date: Oct. 22, 2009

(65) Prior Publication Data
US 2011/0051885 A1 Mar. 3, 2011

(30) Foreign Application Priority Data
Apr. 18, 2008 (EP) .................................... 08154768

(51) Int. Cl.
*G06K 9/00* (2006.01)
(52) U.S. Cl.
USPC ....................................................... 382/131
(58) Field of Classification Search
None
See application file for complete search history.

(56) References Cited

U.S. PATENT DOCUMENTS

| | | | |
|---|---|---|---|
| 6,839,714 B2 * | 1/2005 | Wheeler et al. .......................... | 1/1 |
| 7,646,903 B2 * | 1/2010 | Kaftan et al. .................. | 382/128 |
| 7,925,064 B2 * | 4/2011 | Cloutier et al. ............... | 382/128 |
| 8,150,113 B2 * | 4/2012 | Ray et al. ...................... | 382/128 |
| 8,515,133 B2 * | 8/2013 | Kitamura ...................... | 382/103 |
| 8,532,356 B2 * | 9/2013 | Kiraly et al. .................. | 382/131 |
| 8,630,467 B2 * | 1/2014 | Masumoto .................... | 382/128 |
| 2005/0107679 A1 * | 5/2005 | Geiger et al. ................. | 600/407 |
| 2006/0023925 A1 | 2/2006 | Kiraly et al. | |
| 2007/0001879 A1 * | 1/2007 | Kaftan et al. .................... | 341/79 |
| 2007/0217664 A1 * | 9/2007 | Flipo et al. .................... | 382/128 |
| 2008/0247622 A1 * | 10/2008 | Aylward et al. ............... | 382/131 |
| 2010/0290693 A1 * | 11/2010 | Cohen et al. .................. | 382/134 |

FOREIGN PATENT DOCUMENTS

| | | |
|---|---|---|
| JP | 200744488 A | 2/2007 |
| WO | 2004027711 A1 | 1/2004 |
| WO | 2006036842 A2 | 4/2006 |

(Continued)

OTHER PUBLICATIONS

Extraction and Classification of Pulmonary Organs Based on Thoracic 3D CT Images. Tozaki et al, Aug. 2001.*

(Continued)

*Primary Examiner* — Nancy Bitar (57) ABSTRACT

A method of identifying at least part of a pulmonary artery tree (402) comprises receiving (102) a bronchial tree structure (500) and receiving (104) a pulmonary vessel structure (400). A pair of a first bronchial segment (602) and a first vessel segment (604) is identified (106), wherein the first bronchial segment and the first vessel segment are adjacent with respect to position and orientation. The first vessel segment is identified (108) as arterial segment of the pulmonary artery tree. A spatial transformation is applied (110) such that the first bronchial segment and the first vessel segment substantially coincide (602'). Respective further vessel segments (606, 608) are identified (112) adjacent to bronchial segments (610, 612), wherein the bronchial segments are comprised in the bronchial tree.

18 Claims, 7 Drawing Sheets

(56) References Cited

FOREIGN PATENT DOCUMENTS

| WO | 2006056923 A1 | 6/2006 |
|----|---------------|--------|
| WO | 2006085254 A1 | 8/2006 |
| WO | 2007095165 A1 | 8/2007 |

OTHER PUBLICATIONS

Aykac et al: "Segmentation and Analysis of the Human Airway Tree From Three-Dimensional X-Ray CT Images"; IEEE Transactions on Medical Imaging, vol. 22, No. 8, Aug. 2003, pp. 940-950.

Tschirren et al: "Segmentation, Skeletonization, and Branchpoint Matching—A Fully Automated Quantitative Evaluation of Human Intrathoracic Airway Trees"; Lecture Notes in Computer Science, Springer Verlag, vol. 2489, Jan. 2002, pp. 12-19.

Schlatholter et al: "Simultaneous Segmentation and Tree Reconstruction of the Airways for Virtual Bronchoscopy"; Medical Imaging 2002: Image Processing, Proceedings of SPIE, vol. 4684, 2002, pp. 103-113.

Saragaglia et al: "Airway Wall Thickness Assessment: A New Functionality in Virtual Bronchoscopy Investigation"; SPIE Medical Imaging, 2007, Proceedings of SPIE, vol. 6511, pp. 65110P-1-65110P-12.

Buelow, T. et al. "Automatic extraction of the pulmonary artery tree from multi-slice CT data". SPIE Proceedings, vol. 5746, (2005), doi:10.1117/12.595286.

Buelow, T. et al. "Point based methods for automatic bronchial tree matching and labeling". SPIE Proceedings, vol. 6143, (2006), doi: 10.1117/12.650024.

Tschirren, J. et al. "Matching and anatomical labeling of human airway tree". IEEE Trans. Med Imaging. (2005) p. 1540-1547.

* cited by examiner

SEGMENTING PULMONARY ARTERIES

FIELD OF THE INVENTION

The invention relates to segmenting pulmonary arteries, more particularly to segmenting at least part of a pulmonary artery tree.

BACKGROUND OF THE INVENTION

Multi-detector row computed tomography (MDCT) allows the acquisition of high-resolution data of the entire thorax. The quality of the data allows the assessment of the bronchi as well as the pulmonary artery tree. Extraction of the pulmonary artery tree is an important pre-processing step, e.g., for embolism detection. Also, in the quantitative assessment of the bronchial tree the accompanying artery tree contains important additional information that can be extracted from MDCT data. Hence, for diagnosis and treatment of asthmatic and emphysematic patients, the simultaneous assessment of the tracheobronchial tree and the accompanying pulmonary artery tree is very important. For example, the ratio of inner bronchial to accompanying arterial diameter is an important parameter in clinical practice in order to detect and quantify airway narrowing and bronchial dilation.

When extracting the pulmonary vessel tree from MDCT data, difficulties may arise when distinguishing pulmonary arteries from veins. For instance, seed-point based region expansion methods for the extraction of the pulmonary arteries suffer from leakage into pulmonary veins.

WO 2006/085254 discloses a method of automatic extraction of a pulmonary artery tree from a 3D medical image, such as multi-slice CT data. In this method, a segmented pulmonary vessel is identified as either an artery or a vein by determining a local measure of arterialness of the vessel. The measure is based on a relation of the orientation of a local bronchus to the orientation of the segmented pulmonary vessel of the local bronchus. When a vessel is identified as a pulmonary artery, it is added to the pulmonary artery tree.

However, the classification of pulmonary arteries and pulmonary veins in the known method sometimes fails.

SUMMARY OF THE INVENTION

It would be advantageous to have an improved method of segmenting at least part of a pulmonary artery tree. To better address this concern, in a first aspect of the invention a method is presented that comprises receiving a data representation of a bronchial tree structure indicative of three-dimensional positions and orientations of bronchial segments of the bronchial tree structure;

receiving a data representation of a pulmonary vessel structure indicative of three-dimensional positions and orientations of pulmonary vessel segments of the pulmonary vessel structure;

identifying a pair of a first bronchial segment of the bronchial tree structure and a first vessel segment of the pulmonary vessel structure, wherein the first bronchial segment and the first vessel segment are adjacent with respect to position and orientation;

identifying the first vessel segment as arterial segment of the pulmonary artery tree;

applying a spatial transformation to at least part of the bronchial tree structure and/or to at least part of the vessel structure, such that the first bronchial segment and the first vessel segment substantially coincide;

identifying respective further vessel segments of the vessel structure which coincide with or are adjacent to respective bronchial segments of the bronchial tree structure, wherein the respective bronchial segments are comprised in at least part of the bronchial tree structure to which the transformation has been applied and/or the respective further vessel segments are comprised in at least part of the vessel structure to which the transformation has been applied; and identifying the respective further vessel segments as arterial segments of the pulmonary artery tree.

Because of the transformation, the bronchial segments and arterial segments in the neighborhood of the first bronchial segment and the first vessel segment are better aligned. Consequently, further adjacent pairs of a further bronchial segment and a further vessel segment can be detected more easily. This is an improvement with respect to the method disclosed in WO 2006/085254, in which the classification of pulmonary arteries and pulmonary veins depends on local image properties and may fail, for example in case a bronchial segment is missed due to locally insufficient image quality.

For example, if a surface model of the bronchial tree structure is given, the transformation allows to overlay the surface model over the vessel structure, thus providing a very good starting point for an active contour algorithm to segment the pulmonary artery tree.

Alternatively, further pairs of adjacent bronchial segments and vessel segments can be detected after the transformation. These further pairs may give rise to further transformations. Preferably, the bronchial tree structure is traversed this way from a bronchial segment close to the trachea and working towards more distal bronchial segments, while applying the appropriate spatial transformations to respective sub-trees of the bronchial segments. This way, the bronchial tree structure and the pulmonary artery tree are adaptively aligned, which improves the separation between pulmonary arteries and pulmonary veins.

BRIEF DESCRIPTION OF THE DRAWINGS

These and other aspects of the invention will be further elucidated and described with reference to the drawing, in which.

DETAILED DESCRIPTION OF EMBODIMENTS

For diagnosis and treatment of for example asthmatic and emphysematic patients, the simultaneous assessment of the tracheobronchial tree and the accompanying pulmonary artery tree plays an important role. The ratio of inner bronchial diameter to accompanying arterial diameter is an important parameter in clinical practice in order to detect and quantify airway narrowing and/or bronchial dilation.

Making use of the tracheobronchial tree, the extraction of the pulmonary artery tree from multi-slice CT data may be automated. Having the bronchial tree and the accompanying arterial tree available, these trees can be used for a joint visualization, for example in a virtual bronchoscopy application. Bronchial and arterial diameters may be measured fully automatically along both trees. Positions where the ratio of these radii exhibits unusual values can be marked in the display and brought to the attention of a radiologist for further assessment.

The methods and systems described herein may be implemented as a software option to a CT scanner console, an imaging workstation, or a PACS workstation, for example. The results may be visually displayed. Such a display may contain for example the combination of the tracheobronchial and pulmonary artery trees as well as indications of potentially diseased areas.

Multi-detector row computed tomography (MDCT) allows the acquisition of high-resolution data of the entire thorax. The quality of the data allows the assessment of the bronchi as well as the pulmonary artery tree. Extraction of the pulmonary artery tree is an important pre-processing step, e.g., for embolism detection. Also, in the quantitative assessment of the bronchial tree the accompanying artery tree contains important additional information that can be extracted from MDCT data.

Methods for the extraction of the pulmonary vessel tree as well as the bronchial tree from multi-slice CT data have been presented in the literature. However, seed-point based region expansion methods for the extraction of the pulmonary arteries suffer from leakage into pulmonary veins. Thus, crossings of arteries and veins can easily be misinterpreted as branching points of the vessel tree. Consequently the vessel tree topology obtained from these methods may not be reliable.

Commonly, the segmentations of the tracheobronchial tree and the pulmonary vessel tree are performed separately and thus the relation between the trees is not inherent in the segmentation result.

It is possible to make use of the fact that pulmonary arteries run parallel to the bronchi whereas pulmonary veins—where they come close to the bronchi—tend to cross the airways close to orthogonally. This fact may be exploited by searching the vessel tree segments for nearby, parallel bronchi segments and identifying a vessel segment as artery whenever an accompanying bronchus is found. A drawback of this procedure is that the vessel segments (which are usually substantially linear portions of the vessel tree, and which start at a branching point of the vessel tree and terminate at the next branching point) are treated independently of each other. Thus, whenever a bronchus is not found (which may happen for example due to image noise or insufficient resolution) the corresponding artery segment may be mistakenly identified as a vein. Because of inaccuracies in the vessel segmentation, veins and arteries may be connected in medical images (such as CT images), where in fact the veins and arteries form separate structures. Consequently, it may be better not to propagate the arterialness-property of a detected artery to neighboring vessels.

Rather than evaluating vessel segments independently of each other, the bronchial segments of a subtree of the tracheobronchial tree may be considered, and matched to the vessel tree. This allows detection of an entire subtree of the vessel structure, wherein the subtree corresponds to the given bronchial subtree. This entire vessel-subtree may then be identified as a subtree of the arterial tree.

Figure 1A:
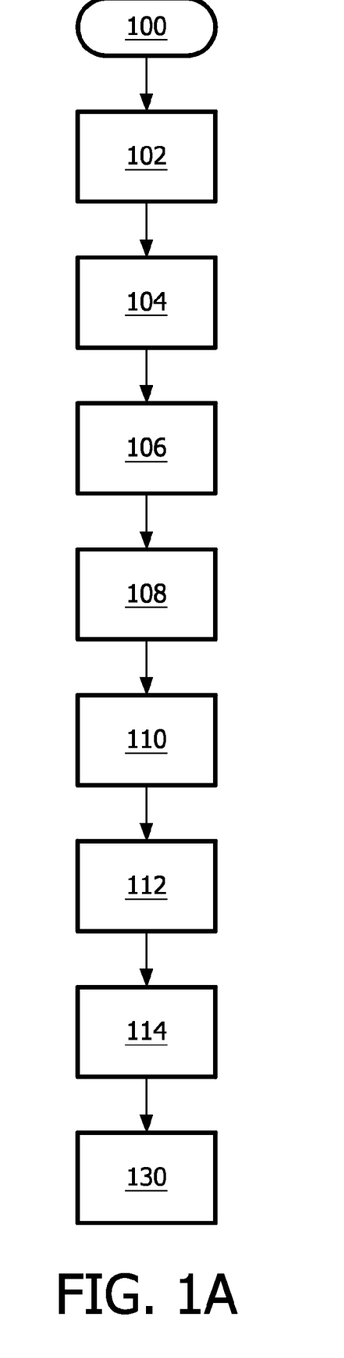
FIG. 1 is a flowchart illustrating processing steps of a method of identifying at least part of a pulmonary artery tree.

FIG. 1A shows a flowchart illustrating processing steps that may appear in an embodiment. Although these processing steps have been drawn in a particular order to simplify the drawing, it is possible to perform the steps in a different order. In step 100, the process is initiated, for example by a user command, or automatically. Automatic initiation of the process may occur for example upon performing a data acquisition by means of a CT device connected to a computer system, while the method is designed to be executed by means of the computer system.

FIGS. 4A, 4B, 5, and 6A-6H illustrate the process by means of sketches of a pulmonary tree structure and a vessel structure. The processing steps of FIG. 1A will be explained in conjunction with these Figures. To this end, a brief description of these Figures will be provided first.

Figure 4A:
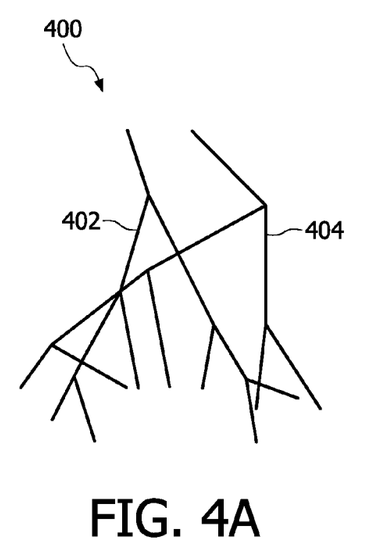
FIG. 4A illustrates a pulmonary vessel structure.

FIG. 4A shows a pulmonary vessel structure 400. This vessel structure 400 preferably has been segmented in a pre-processing step. However, the vessel structure 400 may also be computed on-the-fly during the process of FIG. 1A. The vessel structure 400 comprises at least part of a pulmonary artery tree 402 and at least part of a pulmonary venous tree 404. Due to inaccuracies of the image scanning device used to image the patient, the vessel structure 400 available to the method may not be completely correct. In particular, in the vessel structure 400 connections may appear between pulmonary arteries 402 and pulmonary veins 404, while these connections in reality do not exist. These false connections may make it difficult to establish exactly which portions of the vessel structure 400 belong to the pulmonary artery tree 402 and which portions of the vessel structure 400 belong to the pulmonary venous tree 404.

Figure 4B:
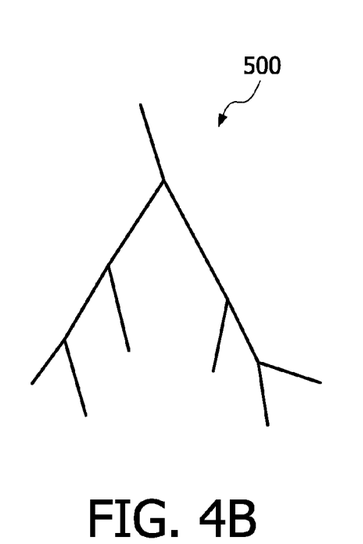
FIG. 4B illustrates a bronchial tree structure.
Figure 5:
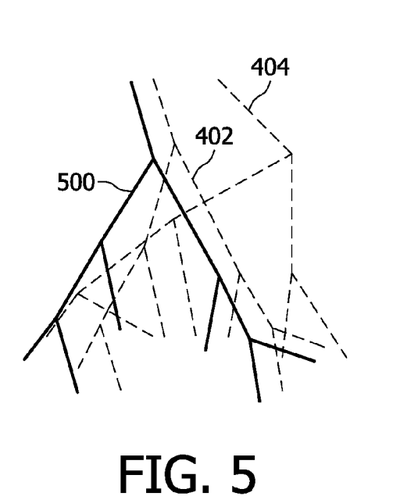
FIG. 5 illustrates the pulmonary vessel structure in relation to the bronchial tree structure.

FIG. 4B illustrates a bronchial tree structure 500. Preferably the bronchial tree structure 500 is more reliable in that it does not have many false connections between different bronchia. The bronchial tree structure 500 and the pulmonary vessel structure 400 are obtained for the same patient. FIG. 5 shows the structures 400 and 500 together. It can be seen that the pulmonary vessel structure 400 is shown in FIG. 5 using dashed lines, whereas the bronchial tree structure 500 is shown using continuous lines.

FIG. 6 shows several stages of a process of identifying at least part of the pulmonary artery tree 402. The identified portions of the pulmonary artery tree are indicated by means of dotted lines (e.g. at 604).

Referring back to FIG. 1, after the process has been initiated in step 100, the process proceeds. In step 102, a data representation of the bronchial tree structure 500 is received. This data representation is indicative of three-dimensional positions and orientations of bronchial segments of the bronchial tree structure. For example, the data structure comprises a centerline model of the bronchial tree or a surface model of the bronchial tree. Alternatively or additionally, the data structure may comprise a voxel data set, wherein the voxels that are part of the bronchial tree structure have been labeled accordingly. The most convenient way in which the bronchial tree structure may be represented is by means of 3D coordinates defining line pieces for each substantially linear portion of the bronchia. However, the way the structures are represented is not to be construed in a limiting sense.

In step 104, a data representation of the pulmonary vessel structure 400 is received. This data representation is indicative of three-dimensional positions and orientations of pulmonary vessel segments of the pulmonary vessel structure. What has been mentioned in the context of step 102 about the representation of the bronchial tree structure may be repeated here for the representation of the pulmonary vessel structure 400. Also the pulmonary vessel structure 400 may be represented in many different ways as known in the art.

Figure 6A:
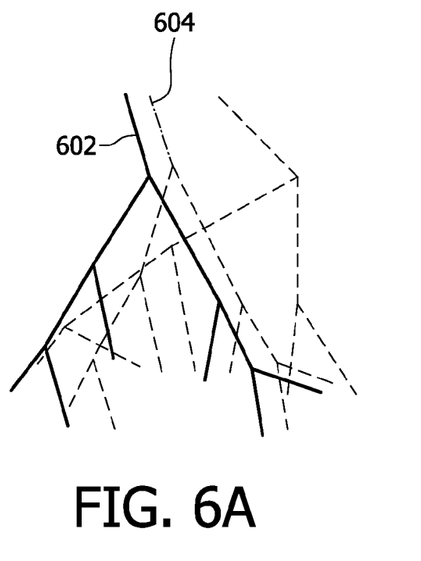
FIGS. 6A-6H illustrate aspects of several phases of a process of identifying a part of a pulmonary artery tree.
Figure 6B:
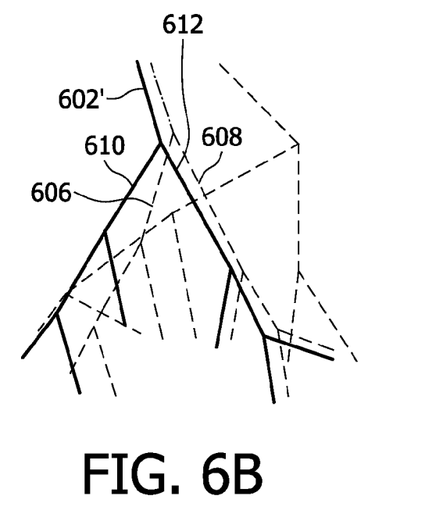
Figure 6C:
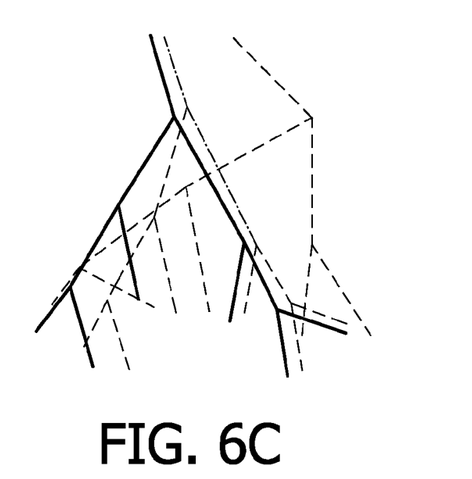
Figure 6D:
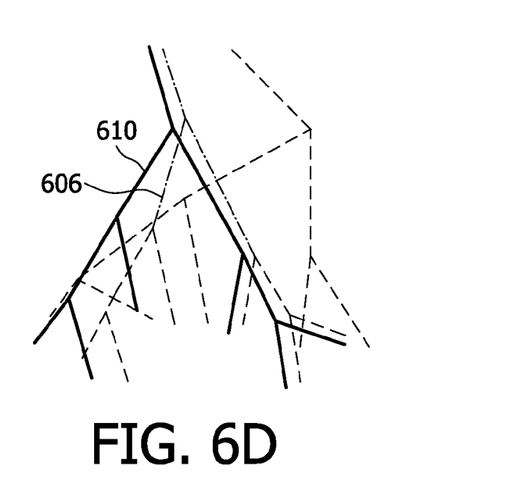
Figure 6E:
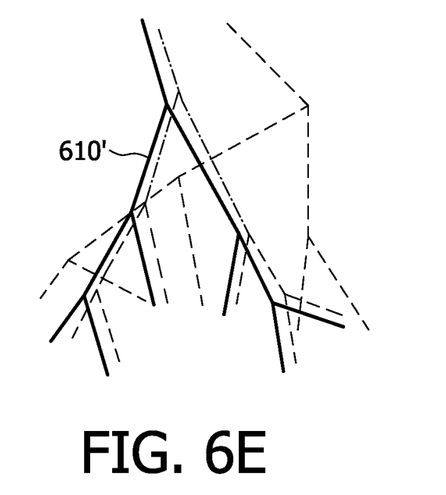
Figure 6F:
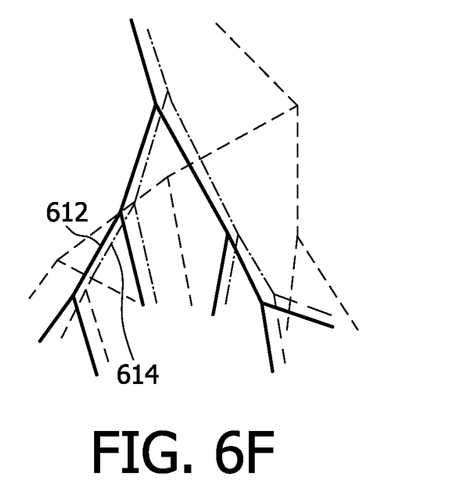
Figure 6G:
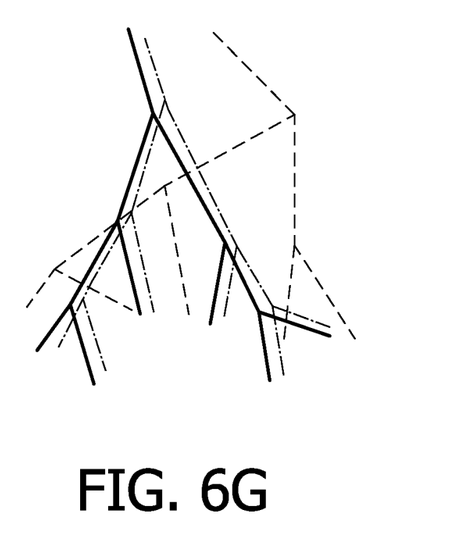
Figure 6H:
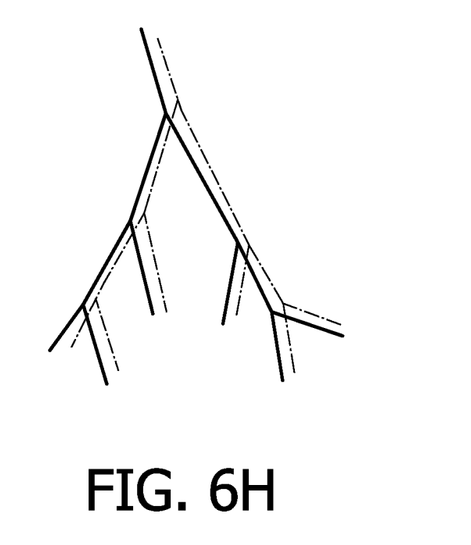

In step 106, a pair of a bronchial segment 602 of the bronchial tree structure and a vessel segment 604 of the pulmonary vessel structure is identified. The bronchial segment 602 and the vessel segment 604 of the pair are adjacent with respect to position and orientation. This adjacency may be evaluated by means of an adjacency measure, which may be a function of the position and direction of the two segments 602 and 604. The position may be compared by evaluating the smallest distance between any point on the bronchial segment 602 and any point on the vessel segment 604. The direction may be compared using an inner product of directional vectors of the two segments 602 and 604. The smallest distance and a reciprocal of the inner product may be multiplied to obtain an adjacency measure, for example. If the adjacency measure is below a predetermined threshold, the two segments may be identified as a pair. Alternatively, the adjacency measure is evaluated for a plurality of vessel segments 604 and/or bronchial segments 602, and the smallest value of the adjacency measure indicates the identified pair.

In step 108, the vessel segment 604 is identified as arterial segment of the pulmonary artery tree. Here, the fact that the pulmonary arteries run adjacent to the bronchial tree is used to identify a vessel segment as an arterial segment. To realize such an identifying step, a label indicative of 'arterial segment' may be associated with the vessel segment 604. Alternatively, a list of references to arterial segments may be created. Another alternative is to directly display the vessel segment(s) identified as arterial segment(s). More alternatives are apparent to the skilled person in view of this description and the associated drawings.

In step 110, a spatial transformation is applied to at least part of the bronchial tree structure and/or to at least part of the vessel structure. This or these transformations are carried out in such a way that the bronchial segment 602 and the vessel segment 604 substantially coincide, as indicated at 602'. Preferably the spatial transformation is a rigid transformation because of its relative simplicity. Preferably the spatial transformation comprises a translation. Optionally the spatial transformation comprises a translation and a rotation to enable a very good match between the bronchial segment 602 and the vessel segment 604.

It is noted that for reasons of clarity, in FIG. 6 the coinciding portions of the bronchial tree and the arterial tree have been drawn beside one another (see for example at 602'). However, when performing the step 110 in practice, preferably the transformations are carried out such that the bronchial segment 602 and the arterial segment 604 actually coincide as much as possible.

For example, step 110 comprises identifying a subtree of the bronchial tree structure. Such a subtree has the bronchial segment 602 as a root and comprises bronchial segments (e.g., 610 and 612) that are more remote from a trachea than the bronchial segment 602. The spatial transformation is then applied to at least the subtree or to the vessels of the vessel structure surrounding the bronchial segments of the subtree. Preferably the subtree of the bronchial tree is spatially transformed, and the vessel structure is left as it is, because the subtree of the bronchial tree is easier to delineate than the vessel structure surrounding the bronchial segments of the subtree. Alternatively, the whole bronchial tree is spatially transformed while processing of bronchial segments of the subtree takes place. After processing the bronchial segments of the subtree, the spatial transformation may be undone before processing of a possible remainder of the bronchial tree takes place.

In step 112, respective further vessel segments (e.g. 606, 608) of the vessel structure are identified. These further vessel segments coincide with or are adjacent to respective bronchial segments 610, 612 of the bronchial tree structure, wherein the respective bronchial segments 610, 612 may be comprised in at least part of the bronchial tree structure to which the transformation has been applied. However, if the vessel structure has been transformed, the respective further vessel segments may be comprised in at least part of the vessel structure to which the transformation has been applied. For example, bronchial segments of the part of the bronchial tree structure to which the transformation has been applied may be processed one by one. When processing a bronchial segment 612, an adjacent vessel segment 608 is searched as described in relation to step 106. This adjacent vessel segment 608 is an identified further vessel segment 608.

In step 114, these respective identified further vessel segments (e.g. 608) are identified as arterial segments of the pulmonary artery tree 402.

At the end of step 114, when all further vessel segments identified in step 112 have been identified as arterial segments, at least a portion of the pulmonary artery tree 402 has been identified.

In step 130, the identified pulmonary artery tree 402 is used, for example, for visualization thereof without visualizing the veins. The pulmonary artery tree 402 may be displayed in conjunction with the bronchial tree structure 500. Also, because the process has identified pairs of bronchial segments and pulmonary artery segments, these paired segments may be compared to each other. In particular, the diameter of the pulmonary artery at any given point may be compared to the diameter of the adjacent part of the bronchus. For example the ratio of these two diameters may be computed. This information may then be displayed, and clinically relevant values of these ratios may be highlighted on a display or printed.

Figure 1B:
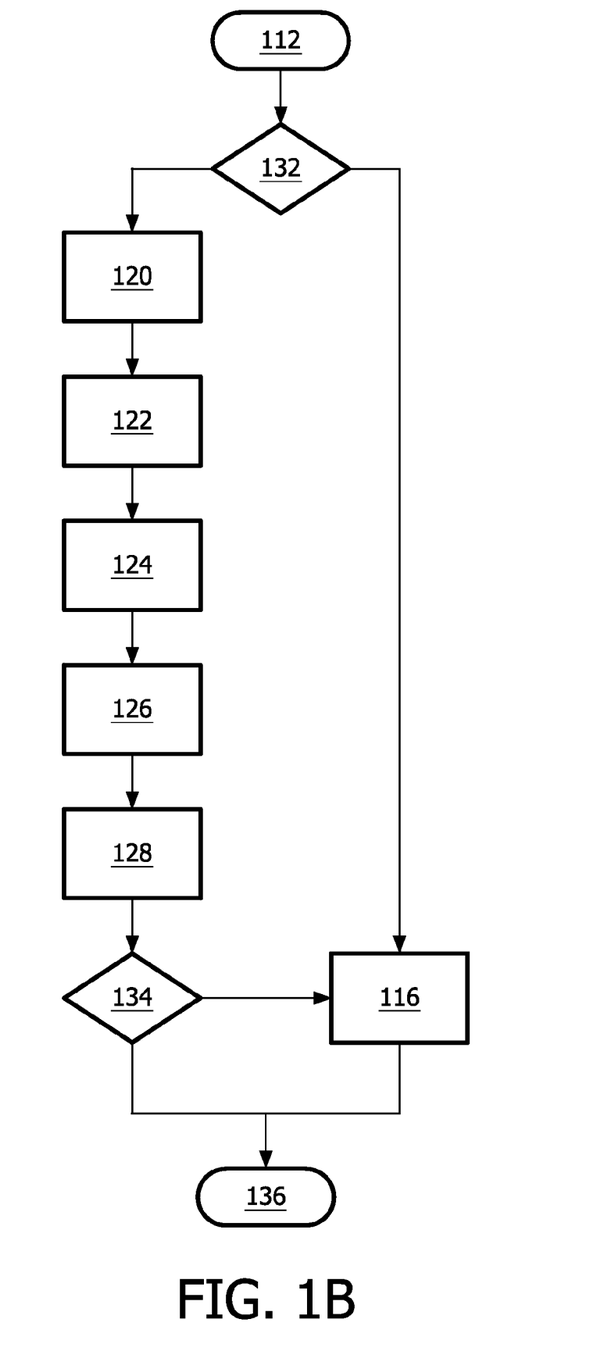

FIG. 1B illustrates several embodiments of step 112 in more detail. In an embodiment, the data representation of the bronchial tree structure 500 comprises a surface model of the bronchial tree structure 500. The surface model comprises for example a triangular surface mesh. The surface model indicates the three-dimensional shape of the walls of the bronchia. In step 132, it may be established that a surface model of the bronchial tree structure 500 is present, and that adaptive surface modeling of the pulmonary artery tree 402 is desired. In this case, step 116 is performed. In step 116, a surface model-based segmentation algorithm is used to adapt the surface model of the bronchial tree structure into a surface model of the pulmonary artery tree using high, directed image gradients as attractive forces.

Step 116 may be performed by means of an active surface deformation algorithm. Such an algorithm is known from "Airway wall thickness assessment: a new functionality in virtual bronchoscopy investigation", by A. Saragaglia et al., in SPIE Medical Imaging 2007, Proc. of SPIE, Vol. 6511, 65110P (hereinafter: Saragaglia et al.). Saragaglia et al. describes surface model deformation for the purpose of an automated approach for volumetric quantification of the bronchial wall in the context of therapy follow-up. The model is initialized to a pre-segmented bronchial lumen boundary; the adaptive deformation process is used to transform the surface model of the inner airway wall into a surface model of the external surface of the airway wall. As the external forces, a gradient force is defined and a balloon force is defined. The algorithm as described in Saragaglia et al. may be adapted by the skilled person to enable it to find a surface model of the pulmonary arteries in the manner described hereinafter. The adaptive surface model is initialized to the surface model of the bronchia as spatially transformed in step 110. The gradient force may be used as the external force, for example, omitting the balloon force as described in Saragaglia et al. Since the vessel boundaries have much larger image gradients than bronchial walls, the gradient exhibits a relatively strong attractive force when used to model the vessels. The skilled person is aware of different kinds of internal and external forces which may be applied to adapt the surface model to the pulmonary artery tree, as known to the skilled person. An advantage of this way of modeling the pulmonary arteries is that the surface model of the bronchia is used as a patient specific model to initialize the adaptive surface model. The spatial transformation of step 110 (for example a translation) ensures that the surface model as initialized is close to the pulmonary artery walls. This way, a highly reliable initialization of the adaptive surface model is obtained, which results in a high quality segmentation of the pulmonary artery tree. It is important in this context that the bronchial tree is a patient specific model for the pulmonary arterial tree. The inter-patient variation of the arterial tree is generally too large to use a generic model.

In another embodiment, there may be no surface model present or it may be desirable to use another way of identifying the pulmonary arteries. Consequently, in step 132 it may be established that another way of identifying respective further vessel segments is desired. In that case, the method proceeds to steps 120-128.

In step 120, a bronchial segment 610 which is attached to the bronchial segment 602 is identified within the subtree of which the bronchial segment 602 is the root. The bronchial segment 610 is attached to the bronchial segment 602 in the sense that they are joined at one end.

In step 122, a vessel segment 606 of the vessel structure 400 is identified for which it holds that said vessel segment 606 coincides with or is adjacent to the bronchial segment 610. Because of its adjacency to the bronchial segment 610, the vessel segment 606 is identified as one of the respective further vessel segments to be identified as pulmonary artery segments in step 114.

In step 124, a second subtree of the bronchial tree structure is identified such that this subtree has the bronchial segment 610 as a root.

In step 126, another spatial transformation is applied to at least the subtree identified in step 124 and/or at least the vessels of the vessel structure surrounding the bronchial segments of the subtree identified in step 124. This spatial transformation is performed in such a way that the bronchial segment 610 and the vessel segment 606 substantially coincide, as schematically indicated at 610'. The spatial transformation is preferably a rigid transformation, because of its efficiency and easy implementation. This spatial transformation preferably comprises a rotation around a point where the second bronchial segment is attached to the first bronchial segment, because the latter point has already been corrected at the previous transformation, and in principle only a correction for the orientation of the bronchial segment 610 is needed.

In step 128, respective further vessel segments 614 of the vessel structure are identified. Only further vessel segments 614 which coincide with or are adjacent to respective bronchial segments 612 of the second subtree are identified.

At step 134 another decision is made. In some embodiments, only steps 120-128 are performed and step 116 is skipped. However, it is also possible to apply the transformations of step 126 to respective parts of a surface model of the bronchial tree, in order to make the surface model an even better initialization of the adaptive surface model of step 116. Consequently, from step 134 the process may continue with step 116 to perform adaptive surface modeling. Alternatively, from step 134 the process proceeds directly to terminator 136 and the process continues with step 114.

It will be understood that the steps described above may be implemented in software. A computer program product may be provided which contains the method of identifying at least part of a pulmonary artery as a subroutine, for example. The computer program product may be a comprehensive medical imaging software suite. The computer program product may also be a backend software product of a medical imaging device such as a CT scanner, or an MRI scanner, for example.

Figure 2:
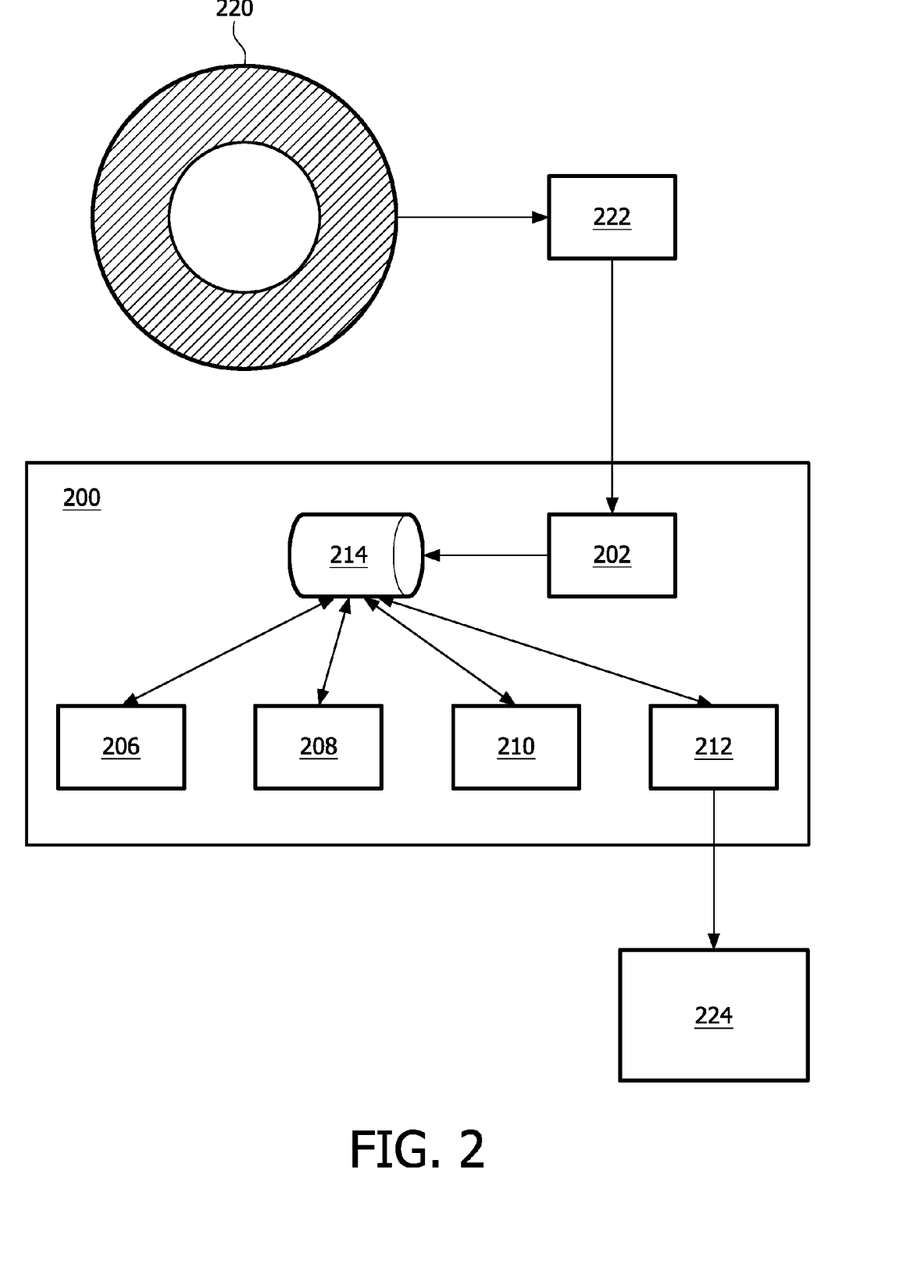
FIG. 2 is a block diagram of a system for identifying at least part of a pulmonary artery tree.

FIG. 2 illustrates a system for identifying at least part of a pulmonary artery tree. The system comprises a CT scanning device 220 for scanning a patient by means of x-rays. Such CT scanners are known in the art. Preferably a multi-slice CT scanner is used. The raw data acquired by the x-ray detectors present in the CT scanning device 220 is transferred to a pre-processing unit 222, which pre-processes the data by performing known computed tomography computations, which results in a volume data set. The pre-processing unit 222 may also perform further processing, such as segmentation of the pulmonary vessel structure and the bronchial tree structure. These structures may be stored in a data representation as, for example, a centerline model and/or as a surface model, as known in the art. Consequently, a data representation of a bronchial tree structure indicative of three-dimensional positions and orientations of bronchial segments of the bronchial tree structure is created by the pre-processing unit 222. Also, a data representation of a pulmonary vessel structure indicative of three-dimensional positions and orientations of pulmonary vessel segments of the pulmonary vessel structure is created by pre-processing unit 222. These data representations are transferred to a subsystem 200. Input 202 of the subsystem 200 receives the data representations and stores them in a RAM memory 214, for example. Note that other storage may be used, including permanent storage means such as ROM or disk storage means. However, for processing purposes it is most convenient to have the data available in RAM. Also note that other architectural designs are also possible.

The system comprises an adjacency evaluator 206 which accesses the memory 214 for identifying a pair of a first bronchial segment of the bronchial tree structure and a first vessel segment of the pulmonary vessel structure, wherein the first bronchial segment and the first vessel segment are adjacent with respect to position and orientation.

The system comprises an identifying means 208 which accesses the memory 214 for identifying the first vessel segment as arterial segment of the pulmonary artery tree.

The system comprises a transformer 210 which accesses the memory 214 for applying a spatial transformation to at least part of the bronchial tree structure and/or to at least part of the vessel structure, such that the first bronchial segment and the first vessel segment substantially coincide.

The adjacency evaluator 206 may be arranged for identifying respective further vessel segments of the vessel structure which coincide with or are adjacent to respective bronchial segments of the bronchial tree structure, wherein the respective bronchial segments are comprised in at least part of the bronchial tree structure to which the transformation has been applied and/or the respective further vessel segments are comprised in at least part of the vessel structure to which the transformation has been applied. The identifying means 208 may be arranged for identifying the respective further vessel segments as arterial segments of the pulmonary artery tree.

The results from the components 206-210 may be stored in the memory 214. Presentation unit 212 retrieves the vessel segments identified as arterial segments of the pulmonary artery tree from the memory 214 and creates a graphical representation thereof for display on a display unit 224. The graphical representation may also comprise a graphical representation of the bronchial tree. Moreover, the presentation unit 212 may compute a ratio of the vessel cross section of a local pulmonary artery and a corresponding local bronchus, and show the results on the display 224, preferably highlighting unusual values and/or values associated with a disease.

An embodiment of the invention comprises a method which will be described in the following. In a first step, the bronchial tree structure and the pulmonary vessel structure are extracted from the image. The bronchial tree as well as the pulmonary vessel tree may be extracted using existing algorithms. Such algorithms may be found in, for example, Büllow et al. and in "Simultaneous segmentation and tree reconstruction of the airways for virtual bronchoscopy", by T. Schlathölter et al., SPIE Medical Imaging, Proceedings of SPIE Vol. 4684, pp. 103-113 (2002). Other methods have been published as well. It should be noted that the extracted pulmonary vessel structure may not correctly represent the arterial tree structure, because it is difficult to separate the arteries from the veins, and because veins may be connected to arteries in the extracted pulmonary vessel structure, where in reality the veins and arteries merely cross each other without being connected.

Large parts of the bronchial tree and the arterial tree run in parallel. However, the roots of the trees and the first large branches of the bronchial tree usually do not run in parallel with the arterial tree. So, in a second step the largest subtrees of the bronchial tree are identified, which do run parallel to corresponding subtrees of the arterial tree. In order to achieve this sub-tree identification, the vicinity of vessel segments is checked for bronchial segments parallel to the vessel segments. This step may be performed substantially as described in Büllow et al. This step may be performed for all linear segments of the vessel tree. This is done by first estimating the vessel orientation of the vessel segment under investigation. This can be done by computation of the structure tensor, and its eigenvectors. After computation of the vessel orientation, a cross sectional plane of the vessel and its surroundings is searched for cross-sections of bronchi.

Figure 3:
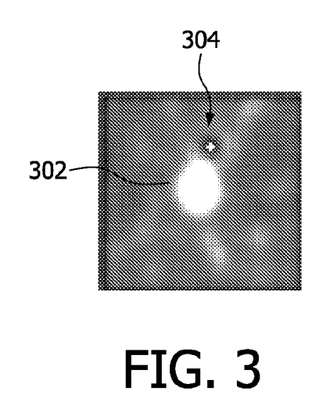
FIG. 3 is an illustration of a cross section of a bronchial segment and an adjacent pulmonary artery segment.

FIG. 3 shows such a cross sectional plane. The Figure shows a vessel cross section 302 (white) and an accompanying bronchus cross section 304 (black, marked by a white "+" sign inside).

If a cross section of a bronchus has been identified, also the orientation of that bronchus is estimated. The orientation of the vessel segment is compared to the orientation of the bronchus (for example by computing the inner product of two normalized directional vectors corresponding to the two orientations), to obtain a degree of parallelism. If the degree of parallelism is above a certain threshold, the vessel segment is identified as the arterial segment that belongs to the accompanying bronchial segment.

When a vessel segment is identified as the arterial segment that belongs to an accompanying bronchial segment, that accompanying bronchial segment is a candidate for a subtree of the bronchial tree that runs parallel to a subtree of the arterial tree. However, it may be the case that a candidate subtree belongs to a larger subtree of the bronchial tree which runs parallel to a subtree of the arterial tree. Consequently, the parent segment of the bronchial subtree, which is the bronchial segment which connects the bronchial subtree to the remainder of the bronchial tree, is checked for a parallel vessel segment as well. If, as a consequence, the parent segment is also identified as running parallel to a corresponding arterial segment, then the subtree of which the parent segment is the root replaces the previously identified subtree. A subtree of the bronchial tree should be understood to comprise a root (which is the bronchial segment closest to the trachea) and all bronchial segments connected to the root that are further away from the trachea than the root.

This process is continued until it arrives at a parent segment that does not have a vessel segment running parallel and close to it. The current subtree is not enlarged any more. Usually more than one subtree can be identified in the described manner.

However, other algorithms may be used to establish the subtrees of the bronchial tree. For example, one may start at the root or roots of the bronchial tree, and work down the bronchial tree until a bronchial segment is found having a vessel segment close and parallel to it. The subtree of that bronchial segment is identified as one of the identified subtrees, and the bronchial segments in the identified subtrees do not have to be evaluated at this stage. This process is continued until all bronchial segments of the bronchial tree have either been evaluated or identified as part of an identified subtree.

By matching the identified sub-trees of the bronchial tree to the vessel tree, arterial-subtrees are identified. Either a surface model, or a centerline model, or both, can be used for this purpose. In both cases, the surface or centerline model is initialized by shifting the root of the bronchial tree model over the corresponding arterial vessel segment.

When using a centerline model, the following procedure may be followed. For the root segment of the bronchial subtree, a corresponding vessel segment has already been identified, as described above.

In an iterative process, starting at the root of the bronchial subtree and including the next generations of the subtree one by one, the respective bronchial segments are matched to respective parts of the vessel structure adjacent thereto. These matched respective parts of the vessel structure are identified as parts of the pulmonary artery tree. Initially the bronchial subtree root segment is positioned over its corresponding vessel segment, which is thus identified as artery segment. Next, the vicinity of the two child segments of the bronchi root segment is investigated to find adjacent vessel segments. These adjacent vessel segments are also identified as parts of the arterial tree. The newly identified bronchial segments, and their subtrees, can be transformed to match the corresponding adjacent artery segments. The procedure is repeated by including more and more distal generations of the bronchial tree into the matching procedure, until the entire bronchial tree has been matched to parts of the vessel structure. The remaining vessel segments, which were not matched to adjacent bronchial segments, are classified as venous segments. The final result is that the vessel structure has been separated into an arterial tree and a venous tree. Alternatively, a surface model-based segmentation algorithm (such as a suitably modified version of the method described in Saragaglia et al.) may be used to convert a surface model of a bronchial (sub)tree into a surface model of a pulmonary artery (sub)tree of the same patient. The surface model may be adapted to the vessel tree using high, directed image gradients as attracting forces. In fact, the surface model of the bronchial tree is used as a patient-specific model of the pulmonary artery tree.

The centerline model-based algorithm and the surface model-based algorithms may be combined, for example by first performing the centerline model-based algorithm, and subsequently transforming subtrees of the surface model of the bronchial tree in the same way the subtrees of the bronchial tree have been transformed. This way, the shape of the surface model more closely follows the shape of the pulmonary arteries, which will provide a better initial surface model of the surface model-based algorithm.

After the bronchial tree and the accompanying arterial tree have been made available, these trees can be used for a joint visualization, for example in a virtual bronchoscopy application. Bronchial and corresponding arterial diameters may be measured fully automatically along both trees during the segmentation. Positions where the ratio of these diameters exhibits unusual values can be marked in the display and indicated for further assessment by the radiologist.

Figure 7:
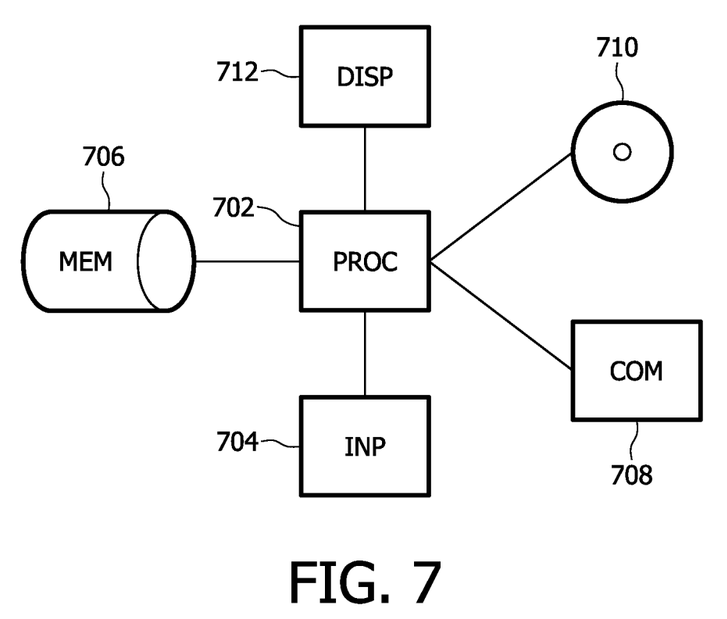
FIG. 7 is a block diagram illustrating possible hardware architecture for implementing a system for identifying at least part of a pulmonary artery tree.

FIG. 7 illustrates example hardware architecture suitable for implementing the methods and systems described herein in software. A memory 706, for example a RAM memory complemented by a hard disk, is provided for storage of data, software code, and computation results. The software code comprises computer-readable instructions which may be executed by processor 702. A communications port 708 is provided for exchanging data with other devices, for example image data may be retrieved via the communications port 708. The communications port 708 may be connected to a network, for example a LAN or a wireless network, or the communications port 708 may be connected directly to a CT scanner or to a PACS system, for example. Data may also be obtained via a removable media device 710, for example a DVD disc. The system is controlled by a user by means of user input device 704. User input device 704 may comprise a keyboard and/or mouse, for example. User interaction is enhanced by means of a display 712 suitable for displaying possible commands to be selected via user input device 704. The display 712 is also used for displaying the result of the computations, for example a visualization of a segmented pulmonary artery tree in conjunction with a bronchial tree.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of identifying at least part of a pulmonary artery tree, comprising:
    receiving a data representation of a bronchial tree structure indicative of three-dimensional positions and orientations of bronchial segments of the bronchial tree structure, wherein the data representation of the bronchial tree structure comprises a surface model of the bronchial tree structure;
    receiving a data representation of a pulmonary vessel structure indicative of three-dimensional positions and orientations of pulmonary vessel segments of the pulmonary vessel structure;
    identifying a pair of a first bronchial segment of the bronchial tree structure and a first vessel segment of the pulmonary vessel structure, wherein the first bronchial segment and the first vessel segment are adjacent with respect to position and orientation;
    identifying the first vessel segment as arterial segment of the pulmonary artery tree;
    applying a spatial transformation to at least part of the bronchial tree structure and/or to at least part of the vessel structure, such that the first bronchial segment and the first vessel segment substantially coincide;
    identifying respective further vessel segments of the vessel structure which coincide with or are adjacent to respective bronchial segments of the bronchial tree structure using a surface model-based segmentation algorithm to adapt the surface model of the bronchial tree structure into a surface model of the pulmonary artery tree using high, directed image gradients as attractive forces, wherein the respective bronchial segments are comprised in at least part of the bronchial tree structure to which the transformation has been applied and/or the respective further vessel segments are comprised in at least part of the vessel structure to which the transformation has been applied; and identifying the respective further vessel segments as arterial segments of the pulmonary artery tree.

2. The method according to claim 1, wherein the step of applying the spatial transformation comprises identifying a subtree of the bronchial tree structure, the subtree having the first bronchial segment as a root, the subtree comprising bronchial segments that are more remote from a trachea than the first bronchial segment, wherein the spatial transformation is applied to at least the subtree or to the vessels of the vessel structure surrounding the bronchial segments of the subtree.

3. The method according to claim 2, wherein the step of identifying respective further vessel segments comprises identifying a second bronchial segment within the subtree and attached to the first bronchial segment;

identifying a second vessel segment of the vessel structure which coincides with or is adjacent to the second bronchial segment, wherein the second vessel segment is one of the respective further vessel segments;

identifying a second subtree of the bronchial tree structure, the second subtree having the second bronchial segment as a root;

applying a second spatial transformation to at least the second subtree and/or at least the vessels of the vessel structure surrounding the bronchial segments of the subtree, such that the second bronchial segment and the second vessel segment substantially coincide; and identifying respective further vessel segments of the vessel structure which coincide with or are adjacent to respective bronchial segments of the second subtree.

4. The method according to claim 3, wherein the second spatial transformation comprises a rotation around an axis, crossing a point where the second bronchial segment is attached to the first bronchial segment, wherein the axis and an angle of rotation are selected such that the second bronchial segment and the second vessel segment substantially coincide after the rotation.

5. The method according to claim 1, wherein the spatial transformation comprises a translation.

6. A non-transitory computer readable medium comprising machine-readable instructions for causing a machine to perform the method according to claim 1.

7. A system for segmenting at least part of a pulmonary artery tree, comprising an input for receiving a data representation of a bronchial tree structure indicative of three-dimensional positions and orientations of bronchial segments of the bronchial tree structure, wherein the data representation of the bronchial tree structure comprises a surface model of the bronchial tree structure, and for receiving a data representation of a pulmonary vessel structure indicative of three-dimensional positions and orientations of pulmonary vessel segments of the pulmonary vessel structure;

an adjacency evaluator for identifying a pair of a first bronchial segment of the bronchial tree structure and a first vessel segment of the pulmonary vessel structure, wherein the first bronchial segment and the first vessel segment are adjacent with respect to position and orientation;

an identifying means for identifying the first vessel segment as arterial segment of the pulmonary artery tree; and a transformer for applying a spatial transformation to at least part of the bronchial tree structure and/or to at least part of the vessel structure, such that the first bronchial segment and the first vessel segment substantially coincide;

wherein the adjacency evaluator is arranged for identifying respective further vessel segments of the vessel structure which coincide with or are adjacent to respective bronchial segments of the bronchial tree structure, wherein the respective bronchial segments are comprised in at least part of the bronchial tree structure to which the transformation has been applied and/or the respective further vessel segments are comprised in at least part of the vessel structure to which the transformation has been applied; and wherein the identifying means is arranged for identifying the respective further vessel segments as arterial segments of the pulmonary artery tree, and wherein the identifying means further uses a surface model-based segmentation algorithm to adapt the surface model of the bronchial tree structure into a surface model of the pulmonary artery tree using high, directed image gradients as attractive forces.

8. The CT scanner comprising the system according to claim 7.

9. The system according to claim 7, further comprising a display unit for displaying the bronchial tree together with the identified arterial segments of the pulmonary artery tree.

10. The system according to claim 7, wherein the identifying means is further arranged for identifying a subtree of the bronchial tree structure, the subtree having the first bronchial segment as a root, the subtree comprising bronchial segments that are more remote from a trachea than the first bronchial segment, wherein the spatial transformation is applied to at least the subtree or to the vessels of the vessel structure surrounding the bronchial segments of the subtree.

11. The system according to claim 7, wherein the identifying means is further arranged to:

identify a second bronchial segment within the subtree and attached to the first bronchial segment;

identify a second vessel segment of the vessel structure which coincides with or is adjacent to the second bronchial segment, wherein the second vessel segment is one of the respective further vessel segments;

identify a second subtree of the bronchial tree structure, the second subtree having the second bronchial segment as a root;

apply a second spatial transformation to at least the second subtree and/or at least the vessels of the vessel structure surrounding the bronchial segments of the subtree, such that the second bronchial segment and the second vessel segment substantially coincide; and identify respective further vessel segments of the vessel structure which coincide with or are adjacent to respective bronchial segments of the second subtree.

12. The system according to claim 11, wherein the second spatial transformation comprises a rotation around an axis, crossing a point where the second bronchial segment is attached to the first bronchial segment, wherein the axis and an angle of rotation are selected such that the second bronchial segment and the second vessel segment substantially coincide after the rotation.

13. The system according to claim 7, wherein the spatial transformation comprises a translation.

14. A method, comprising:

applying a spatial transformation to at least part of a bronchial tree structure and/or to at least part of a vessel structure, such that a first bronchial segment of the bronchial tree structure and a first vessel segment of the vessel structure substantially coincide; and identifying respective vessel segments of the vessel structure which coincide with or are adjacent to respective bronchial segments of the bronchial tree structure, wherein the respective bronchial segments are comprised in at least part of the bronchial tree structure to which the transformation has been applied and/or the respective vessel segments are comprised in at least part of the vessel structure to which the transformation has been applied, wherein a data representation of the bronchial tree structure comprises a surface model of the bronchial tree structure, and wherein the step of identifying respective vessel segments comprises using a surface model-based segmentation algorithm to adapt the surface model of the bronchial tree structure into a surface model of the pulmonary artery tree using high, directed image gradients as attractive forces.

15. The method according to claim 14, wherein the step of applying the spatial transformation comprises identifying a subtree of the bronchial tree structure, the subtree having the first bronchial segment as a root, the subtree comprising bronchial segments that are more remote from a trachea than the first bronchial segment, wherein the spatial transformation is applied to at least the subtree or to the vessels of the vessel structure surrounding the bronchial segments of the subtree.

16. The method according to claim 14, wherein the step of identifying respective vessel segments comprises:

identifying a second bronchial segment within the subtree and attached to a first bronchial segment;

identifying a second vessel segment of the vessel structure which coincides with or is adjacent to the second bronchial segment, wherein the second vessel segment is one of the respective vessel segments;

identifying a second subtree of the bronchial tree structure, the second subtree having the second bronchial segment as a root;

applying a second spatial transformation to at least the second subtree and/or at least the vessels of the vessel structure surrounding the bronchial segments of the subtree, such that the second bronchial segment and the second vessel segment substantially coincide; and identifying respective further vessel segments of the vessel structure which coincide with or are adjacent to respective bronchial segments of the second subtree.

17. The method according to claim 16, wherein the second spatial transformation comprises a rotation around an axis, crossing a point where the second bronchial segment is attached to the first bronchial segment, wherein the axis and an angle of rotation are selected such that the second bronchial segment and the second vessel segment substantially coincide after the rotation.

18. The method according to claim 14, wherein the spatial transformation comprises a translation.

* * * * *